United States Patent [19]
Barnes et al.

[11] Patent Number: 5,950,448
[45] Date of Patent: Sep. 14, 1999

[54] SYSTEM, METHOD AND APPARATUS FOR DISPENSING AND COMBINING REFRIGERATED SOURCE LIQUIDS

[75] Inventors: James H. Barnes; William M. Heatley, both of Dallas, Tex.

[73] Assignee: Foodie Partners, Dallas, Tex.

[21] Appl. No.: 09/021,645

[22] Filed: Feb. 10, 1998

[51] Int. Cl.[6] .................................................. B67D 5/56
[52] U.S. Cl. ......................................... 62/390; 222/146.6
[58] Field of Search ............................. 62/389, 390, 391, 62/342; 222/146.6

[56] References Cited

U.S. PATENT DOCUMENTS

| | | | |
|---|---|---|---|
| 3,479,835 | 11/1969 | Lane et al. | 62/390 |
| 3,642,174 | 2/1972 | Cornelius | 222/146.6 |
| 3,958,428 | 5/1976 | Kelso | 62/342 |
| 4,332,145 | 6/1982 | Yuhasz et al. | 62/342 |
| 4,860,923 | 8/1989 | Kirschner et al. | 62/389 |
| 5,343,716 | 9/1994 | Swanson et al. | 62/389 |
| 5,535,600 | 7/1996 | Mills | 62/390 |

*Primary Examiner*—William E. Tapolcai
*Attorney, Agent, or Firm*—Sanford E. Warren, Jr.; Gardere & Wynne, L.L.P.

[57] ABSTRACT

A comprehensive system, method and apparatus for dispensing, combining and blending refrigerated source liquids, ice, and flavoring additives to create a beverage of pulverized, slush-like consistency. The invention introduces metered volume or time control product dispensing within an architectural framework designed to improve upon the efficiency of product development processes. The invention further provides for improved cleanliness in the preparation of a consumer beverage, while reducing work-area requirements associated therewith.

5 Claims, 5 Drawing Sheets

SYSTEM, METHOD AND APPARATUS FOR DISPENSING AND COMBINING REFRIGERATED SOURCE LIQUIDS

BACKGROUND OF THE INVENTION

The preparation of beverages requiring the combination of refrigerated source liquids, ice and flavoring additives has long presented health, consumer service, product accountability and management concerns for the point of sale of retailer. As used herein, "refrigerated source liquids" refer to those liquids such as juices, yogurt, etc., which serve as base level ingredients in the preparation of pulverized, slush-like consistency consumer beverages. An example of such beverages would be those designated as "slurpy" or "smoothie" type drinks commonly found and retailed at shopping malls, sporting events, theaters and similar retail avenues of trade.

Health concerns associated with the preparation of these beverages relate to the issues of cleanliness/ingredient cross contamination and the maintaining of a consistent and healthful ingredient temperature. As can be readily appreciated, the combining of a number of ingredients within a single blending vessel requires that any number of diverse ingredients be repeatedly transported and introduced to such a vessel. Such repetitive transportation greatly enhances the likelihood of spillage, ingredient contamination and consumer perception of an unsightly, and perhaps unhealthy, product preparation process and facility. Perhaps of greater importance is the potential for retail operation censure, should local health or licensing officials perceive an unclean beverage preparation site, or ingredient temperature variances to be a public health concern.

Consumer service requirements mandate the consumer be provided the beverage of his or her design with a minimum of delay. Expediency however, often presents itself at a cost of inaccurate ingredient measure—a problem equally bothersome to both consumer and retailer. A product lacking in ingredient measure lacks quality, displeases the consumer and places the potential for repeat business at risk. A product providing ingredient measure beyond that which is called for reduces profits.

The retail sale of consumer ready pulverized, slush-like consistency beverages is a highly competitive business. A business which necessitates a detailed awareness of product usage and anticipated consumer demand. Such awareness in turn clearly points to the need for dispensed product accountability. Today's beverage management systems typically rely upon a physical count of empty source liquid vessels to determine the amount of product distributed or sold through a specific retail location. As unauthorized consumption, waste and spillage cannot be accounted for when utilizing these systems, such means of measure prove woefully inadequate. Of equal significance is the fact these systems do not provide for sufficiency of detail and accurate data to project future product trends and requirements.

The following scenario is typically encountered in the preparation of consumer ready pulverized, slush-like consistency beverages. The consumer first specifies the type(s) of source liquids and flavoring additives to be included in the beverage. The person preparing the beverage then introduces those liquids, additives and ice to the blending vessel. Herein lies a problem in that the person preparing the beverage typically risks losing eye contact with the consumer in order to fill the vessel up to a pre-designated "fill to here" line indicating the proper amount of refrigerated source liquid to be dispensed. As is apparent, a huge potential for overage or underage in terms of source liquids to be added to the mixture exists utilizing this process. Of greater significance, however, is the "fill line" dispensing methodology utilized by prior art systems is a tediously slow dispensing methodology. As such, volume processing requirements cannot be addressed adequately and further enhances the likelihood of unfavorable consumer perception.

Prior to blending, the consumer's beverage specification typically requires additional flavoring additives be included in the beverage. Such additives might take the form of fruit, frozen or semi-solid fruit gels, fruit flavorings, protein powders, vitamin compositions or other variety of flavoring additives in vogue at the time of beverage preparation. These additives are typically added to the beverage via ladle or ice cream scoop if of a primarily liquid or semi-frozen composition or "shaken in" if in powdered form. Using facilities consistent with those found in the prior art, great care must be taken at this point not to contaminate other ingredients not involved in the preparation of the immediate beverage as such systems and methodologies typically position these ingredients in areas immediately adjacent to source liquid and ice supply areas.

Counter space cost and availability represent yet additional concerns with respect to servicing the beverage consuming public. Existing systems and their attendant housings do not provide for the efficient organization of ingredients necessary for product preparation. To improve work processes associated with the preparation of pulverized, slush-like consistency beverages, additional counter space must often be leased to make necessary ingredients readily accessible to the person responsible for beverage preparation. Should additional counter space not be available, or cost prohibitive, the retailer is faced with the prospect of moving to a less desirable commercial location. The present invention's use of a remote refrigeration unit to accommodate source liquid requirements results in the reduction of front line refrigeration requirements and an approximate counter space saving of 55% when compared to prior art facilities. The invention's comprehensive, efficient methodology, and improved apparatus to serve and account for beverages processed through such a facility provides for significant improvement over prior art systems.

In view of the aforementioned inadequacies, inefficient state of the art facilities and beverage preparation processes a need has clearly arisen for an improved system, method and apparatus for dispensing and combining refrigerated source liquids, ice and flavoring additives to create a beverage of pulverized, slush-like consistency. A need clearly met and exceeded by the improvements embodied within the present invention.

SUMMARY OF THE INVENTION

The present invention eliminates all of the aforementioned deficiencies manifested in prior art systems designed to prepare and distribute consumer beverages of a pulverized, slush-like consistency. The invention provides a uniform and efficient process to ensure exactness of ingredient measure, improved speed of preparation, uninterrupted ingredient supply during peak consumer transaction periods, management auditability, and controlled distribution of product throughout the beverage preparation lifecycle.

By further providing an apparatus to address efficient ingredient placement, processing and consumer presentation, the present invention improves upon prior art facilities. The preferred embodiment of the invention utilizes a refrigeration unit displaced from the Consumer Service Station "CSS", thus minimizing retail counter space requirements by an estimated 55%. Of greater significance however, are the consistency of product temperature and immediate availability of pre-refrigerated product source capabilities afforded by the invention's configuration and methodology.

The invention's novel introduction of metered product dispensing controls into the pulverized, slush-like consistency beverage venue finally resolves long standing management concerns relating to product consistency and accountability. By controlling the dispensing of refrigerated source liquids according to preset volume or time metered parameters, over-pouring of ingredient measure is eliminated. The invention's introduction of metered dispensing further signals a quantum leap in product allocation, accountability and projection analysis. Product metering within this entirely new venue allows for increased management awareness and control based upon accurate data. Historical analysis of such data provides for report content including, but not limited to, total sales, portions dispensed by source product, price levels, complimentary and unauthorized dispensing of product, and average price per portion of product dispensed.

The comprehensive nature of the present invent clearly resolves those cleanliness, exactness of measure, management and efficiency concerns left lacking in today's pulverized, slush-like consistency beverage preparation scenario.

BRIEF DESCRIPTION OF THE DRAWINGS

Other aspects of the invention and its advantages may be appreciated with reference to the following detailed description taken in conjunction the appended drawings in which.

DETAILED DESCRIPTION OF THE DRAWINGS

Figure 1:
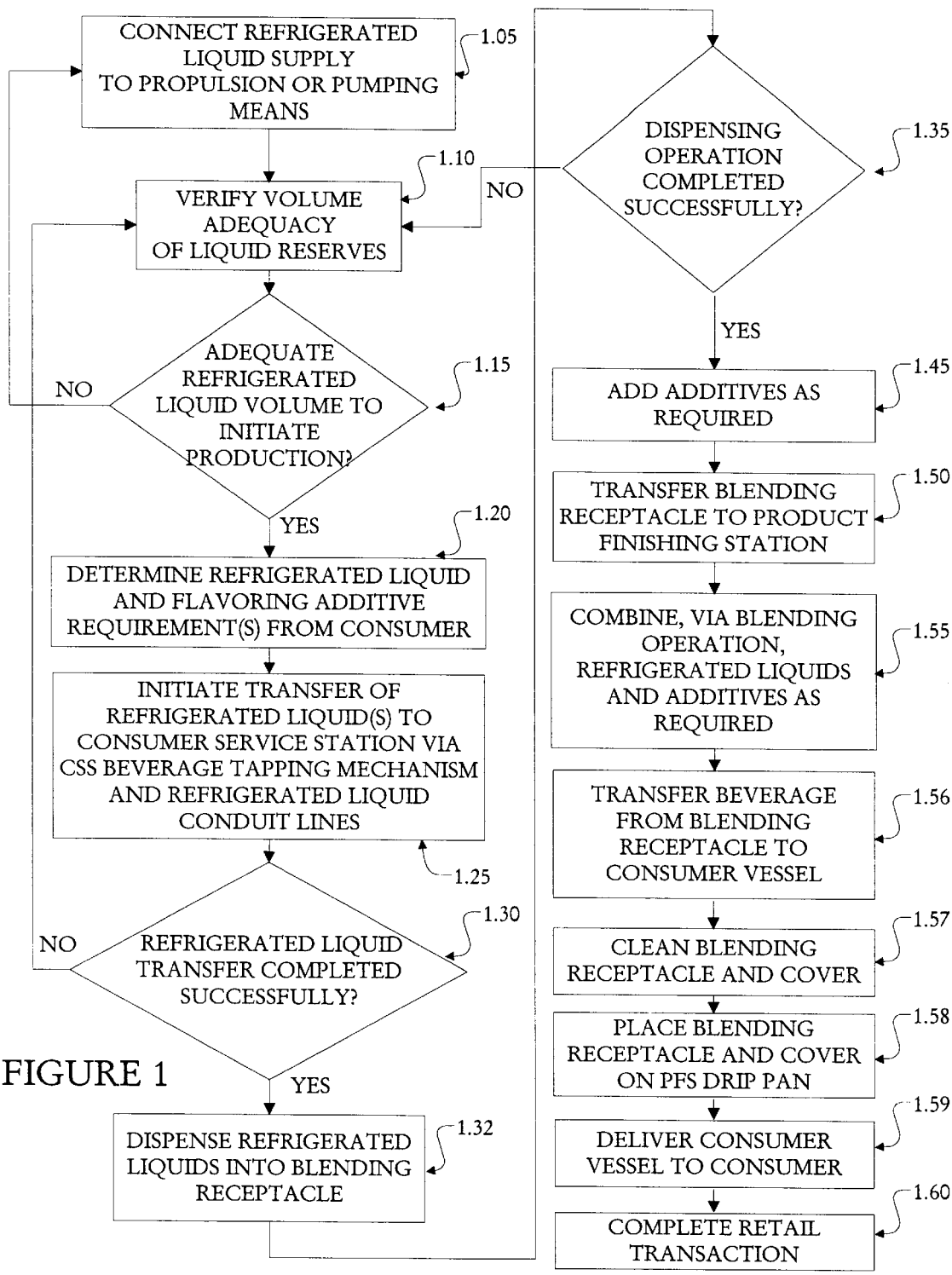
FIG. 1 is a logic flow depiction of the methodology employed in dispensing, combining and blending refrigerated source liquids, ice and flavoring additives to create a beverage of pulverized, slush-like consistency.

Turning now to FIG. 1. the first step in initiating the improved methodology employed in dispensing, combining and blending refrigerated source liquids, ice and flavoring additives to create a beverage of pulverized, slush-like consistency is to connect the refrigerated source liquid to a gaseous propulsion or alternatively, to an electrically powered pumping or mechanism 1.05. In the preferred embodiment, refrigerated source liquids, such as juice and yogurt can be distributed to the retailer in a variety of containerized forms. A most common form of containerized distribution provides such liquids to the retailer in pressurized steel, or similarly constructed metal tanks. In this instance, once connecting the refrigerated source liquid to refrigerated transport lines, movement of the liquid to a Consumer Service Station "CSS" is facilitated via gaseous propulsion, typically that provided by carbon dioxide or a $CO_2$ nitrogen mixture. Another common manner in which refrigerated source liquids are distributed to the retailer is referred to as a "bag in a box" or "B&B", a term well known by those in the trade and skilled in the art. This manner of distribution allows as an alternative to gaseous propulsion, an electric pump to be connected to the refrigerated source liquid in order to effectuate liquid transfer to the CSS. A variety of such transfer effectuation means are readily available for this purpose and all are well known to those in the trade and skilled in the art.

The next step in the system's methodology is to verify that sufficient refrigerated source liquid reserves exist 1.10, prior to initiating contact with the consumer. Having determined that inadequate supplies exist to service anticipated consumer demand, the party responsible for beverage preparation would retrieve an alternative full volume pressurized tank canister, or B&B, and connect this replacement pre-refrigerated liquid supply to the gaseous propulsion or electrically powered pumping mechanism 1.05. Having determined in step 1.10 that adequate supplies exist, the attendant turns his or her attention to the consumer and determines the desired beverage's refrigerated source liquid and flavoring additive requirements 1.20. Though selection of refrigerated source liquids are typically based upon juice or yogurt product offerings, the present invention does not limit itself in scope to such products and contemplates any refrigeration compliant liquid capable of transport via gaseous or electrically powered pumping apparatus through refrigerated conduit lines.

Having determined the refrigerated source liquids desired by the consumer the attendant initiates transfer of such requested refrigerated source liquids to the CSS via a CSS beverage tapping mechanism 1.25. The desired liquids are then transported to the CSS via refrigerated conduit lines whereupon the attendant verifies that adequate refrigerated source liquids have been transferred successfully to the CSS 1.30. If the refrigerated source liquids have not transferred successfully from the remote refrigeration unit to the CSS, the attendant repeats the supply connection and volume adequacy verification processes denoted in steps 1.10 and 1.15 respectfully.

Required refrigerated source liquids having arrived successfully at the CSS, the attendant dispenses such liquids into the blending receptacle in process step 1.32 via the CSS beverage tapping mechanism, a beverage flow measurement device, and a portion control mechanism designed to dispense liquids according to pre-programmed volume or time metered constraints. Examples, of portion control mechanism and beverage flow measurement and reporting devices are those manufactured by the Berg Company of Madison Wis. Though Berg and other similarly intended control systems such as the Multiplex Company's "CompuTap 2.0" system have limited themselves to the dispensing of alcoholic beverages, the present invention improves upon their historic applicability by extending such application to an entirely new venue—the dispensing, combining and blending of refrigerated source liquids to create a beverage of pulverized, slush-like consistency. Having once dispensed an adequate, monitored, controlled and measured and monitored volume of refrigerated source liquid, the retail attendant, verifies that the dispensing operation has completed successfully in step 1.35

Flavoring additives requested by the consumer might be protein powders, dietary supplements, additional fruits, such as cherries, oranges slices, etc., or any host of readily available additives in vogue at the time of beverage preparation. Such additives are ladled or scooped directly into the blending receptacle, if of a liquid or frozen consistency, or "shaken in" if in powdered form 1.45. The design and placement of the present invention's cold bin apparatus allows for the addition of such additives without need to transverse ingredients not involved in preparation of the immediate consumer beverage. In the preferred embodiment, pre-frozen additive "pucks" would be used to facilitate customer flavoring requirements whenever possible—further reducing likelihood of additive contamination and an unsightly work area appearance. Though the addition of flavoring additives has been defined for illustrative purposes in step 1.45, the present invention's methodology provides for sufficient flexibility to allow for such addition in advance of the dispensing of required refrigerated source liquids illustrated in step 1.25.

Having added all requisite flavoring additives at this point the blending receptacle is transported taken to the Product Finishing Station "PFS" in step 1.50, where all beverage ingredients including, ice refrigerated source liquids, and additional flavoring additives are blended into a pulverized, slush-like consistency consumer beverage 1.55. The blending operation is either carried out manually or automatically via a pre-programmed sequence supported by commercial grade blenders well known to those to those in the retail beverage distribution trade.

Upon completion of the blending operation, the pulverized, slush-like consistency consumer beverage is transferred from the blending receptacle to a consumer vessel intended to human consumption 1.56. In the preferred embodiment, the consumer receptacle is a plastic or paper based product of cup or glass-like form, readily known by and commonly available to those in the retail beverage trade. Prior to leaving the PFS, the attendant rinses the blending receptacle and its cover in the PFS rinse sink by initiating a pre-set temperature rinse spray, initiated via a foot activated pedal 1.57. The attendant then returns to the CSS, places the blending receptacle and blending receptacle cover on the PFS drip pan 1.58 and delivers the consumer consumption vessel to the consumer 1.59 whereupon the retail transaction is completed 1.60.

Figure 2:
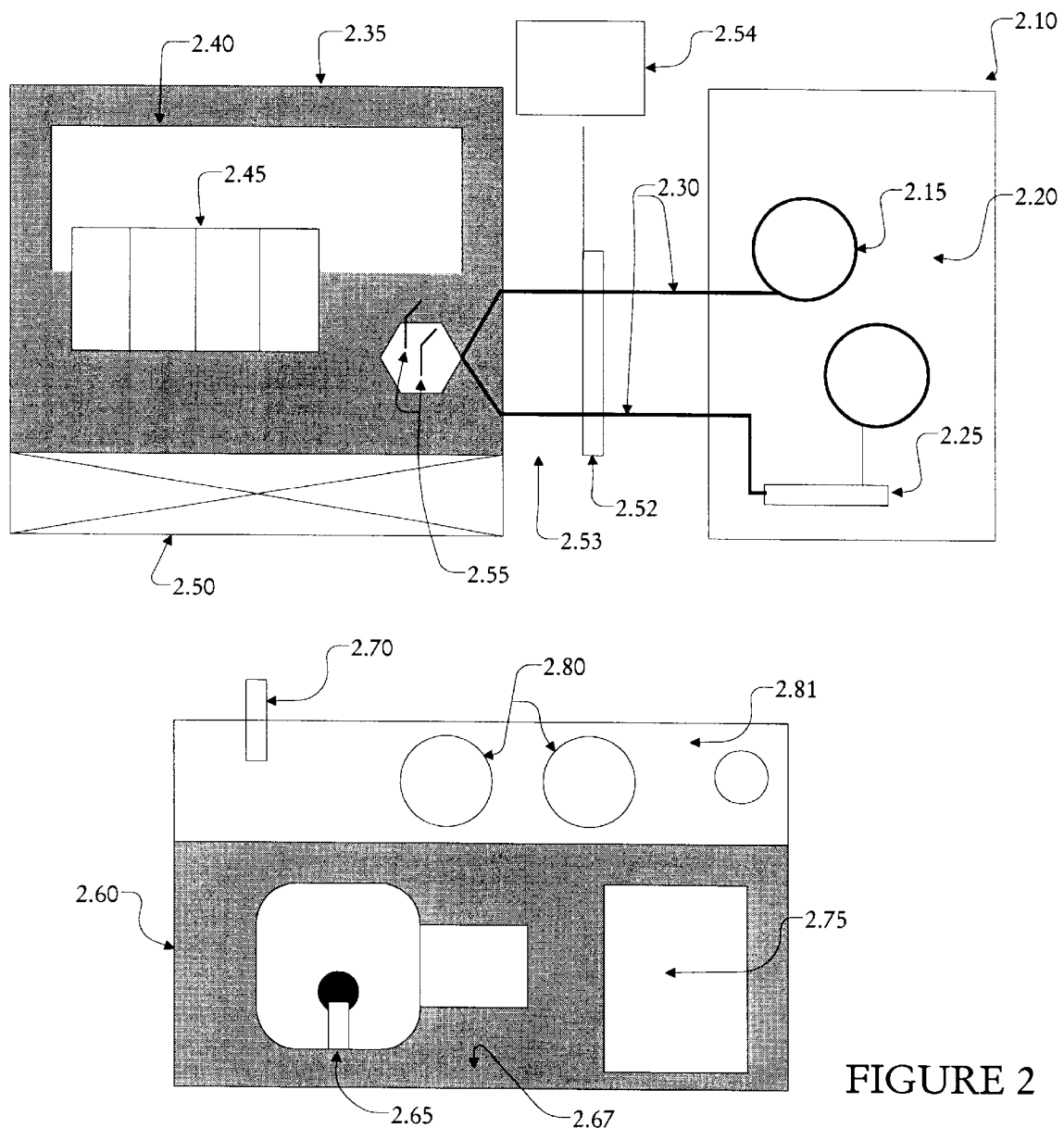
FIG. 2 is a schematic of components comprising the preferred apparatus for dispensing, combining and blending refrigerated source liquids, ice and flavoring additives to create a beverage of pulverized, slush-like consistency.

Referring now to FIG. 2. To greatly reduce the amount of counter space requirements of present day beverage preparation work areas, the invention's preferred embodiment utilizes a remote walk-in refrigerator facility 2. 10. Refrigerated source liquids such as juices, yogurt, etc. are refrigerated and stored in such a remote facility until such time as they are needed. At that time the refrigerated source liquids depicted as 2.15 and 2.20, can be readied for servicing and refrigerated transport to the CSS 2.35. FIG. 2.15 illustrates a source liquid such as juice, yogurt, etc, being stored in a pressurized tank and propelled typically by a gaseous means such as carbon dioxide or a $CO_2$ nitrogen. FIG. 2.20 illustrates a refrigerated source liquid stored in a non-pressurized compartmentalized like facility, typically referred to, and well known as a "Bag in a Box" (B&B) throughout the retail beverage industry. This containerized form of refrigerated source liquid allows as an alternative form of propulsion, an electric pump 2.25 designed to facilitate such a purpose and well known to those within the retail beverage trade.

Upon determining the consumer's refrigerated source liquid requirement(s), a CSS beverage tapping mechanism 2.55 is engaged and such designated refrigerated source liquids are pumped or propelled, via refrigerated conduit lines 2.30 from the remote walk-in refrigerator 2.10 to the CSS 2.35. Transport of the refrigerated source liquids are routed through a Berg or similarly intended portion measurement mechanism 2.52. where a pre-programmed volume or time threshold determines the exact quantity of refrigerated source liquid to be dispensed. Dispensing statistics are maintained for subsequent analysis via an off line computing means, such as a personal computer 2.54. The metered, volume control capabilities of the present invention thus avoids the spillage, over-pour, waste and "nonaccountability" attendant to present day systems.

Refrigerated source liquid(s) are dispensed through the CSS beverage tapping mechanism 2.55, housed within the CSS. Having dispensed the requisite quantity of refrigerated source liquids into a blending vessel, additional flavoring additives are selected from the CSS cold pan 2.45 and further added to the component mixture. A consumer breath guard 2.40 is attached to the CSS to reduce likelihood of ingredient contamination during periods of consumer discourse and beverage preparation.

Having added all of the desired ingredients, the vessel is then transported to the PFS 2.60 where ice, if not previously selected can be added to the consumers beverage from the invention's integrated ice bin 2.75. All beverage ingredients are then integrated via a blending mechanism such as a Vitamix blender 2.80. A consumer consumption vessel is then withdrawn from the cup dispenser 2.81, and the integrated beverage poured into the vessel.

Cleaning operations attendant to beverage preparation are accommodated at the inventions PFS 2.60. A foot activation peddle 2.70 allows a rinsing capability to be initiated at the invention's rinse sink 2.65. The invention provides for further cleaning convenience by allowing blender tops to be placed on a drain board 2.67 while blender mixing units continue to be cleaned and rinsed via upward or downward directed spray.

Figure 3:
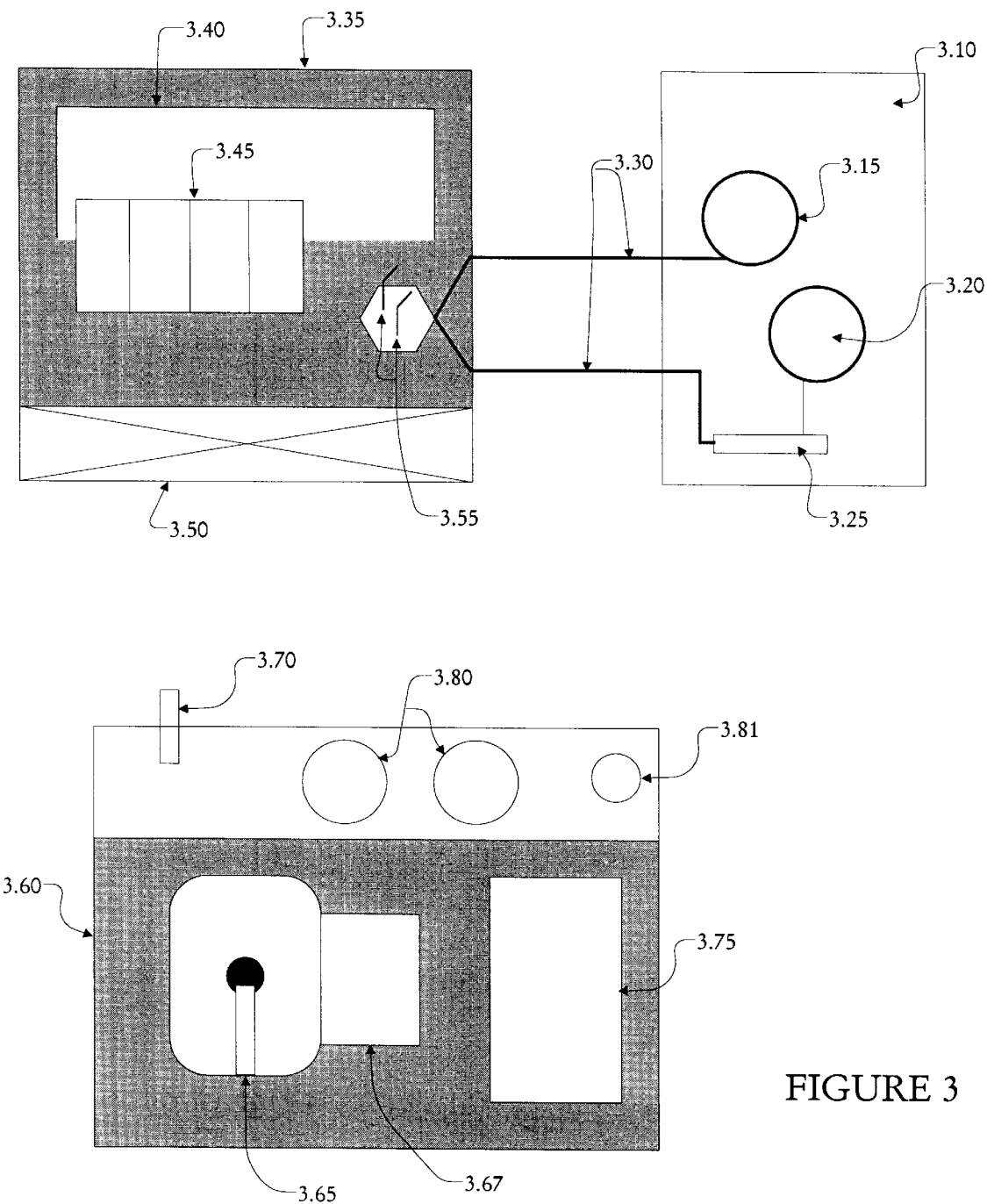
FIG. 3 is a schematic representation of an alternative embodiment of components comprising an apparatus for dispensing, combining and blending refrigerated source liquids, ice and flavoring additives to create a beverage of pulverized, slush-like consistency.

Referring now to FIG. 3. To further reduce costs associated with beverage production, FIG. 3 illustrates an embodiment of the present invention, absent volume control, metering and reporting capabilities. All processes and components absent those relating to volume control, metering and reporting are identical to those discussed in the detailed discussion provided for FIG. 2.

Figure 4:
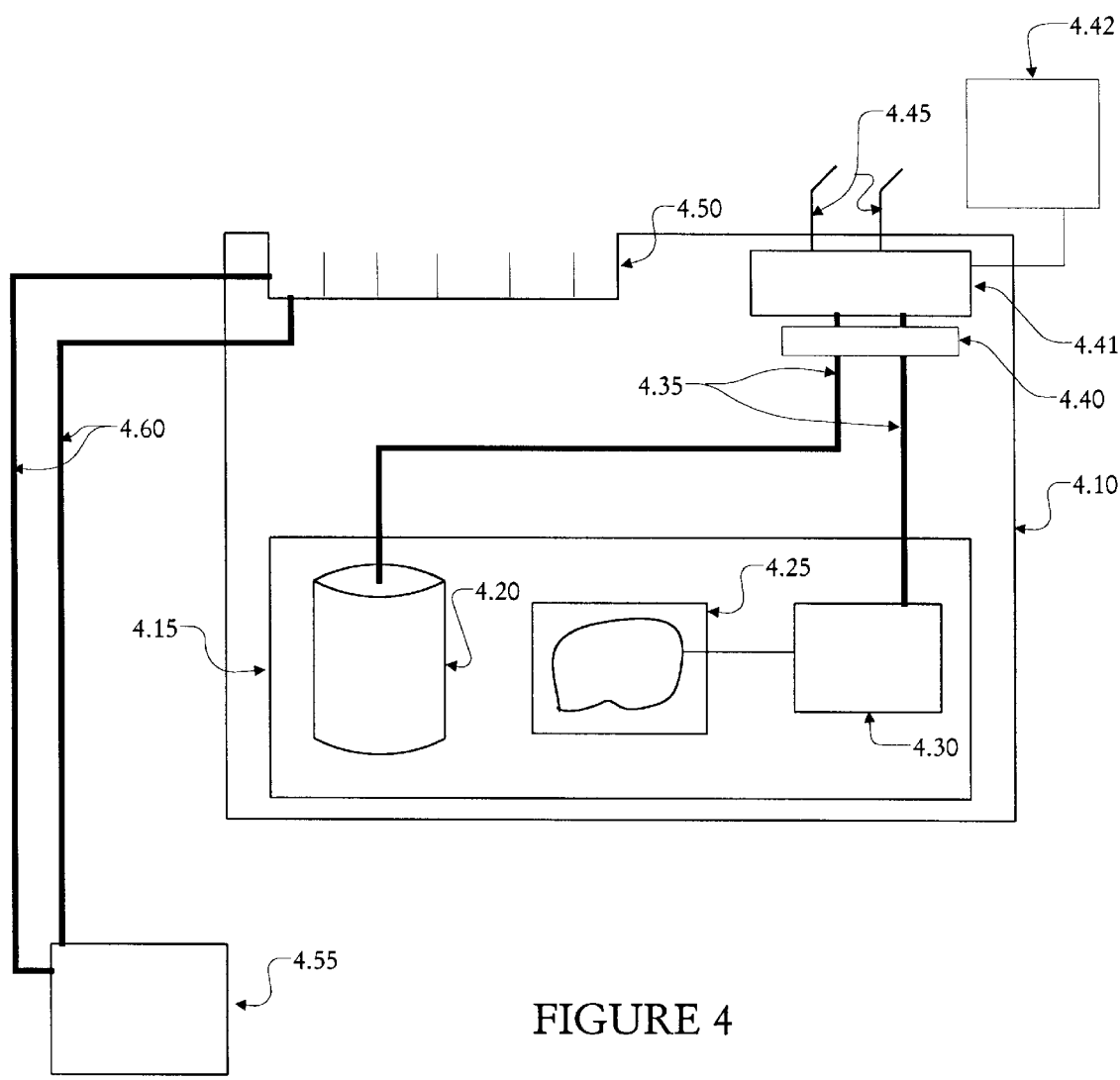
FIG. 4 is a schematic representation of a second alternative embodiment of components comprising an apparatus for dispensing, combining and blending refrigerated source liquids, ice and flavoring additives to create a beverage of pulverized, slush-like consistency.

Referring now to FIG. 4, FIG. 4 shows an alternative embodiment for the invention' with a refrigeration unit integrated within the CSS 4.10. In this alternative embodiment, the pressurized tank refrigerated source liquid 4.20, B&B 4.25 and an alternative electrical pumping facility 4.30 are housed within the refrigeration unit 4.15 underneath the CSS unit's cold pan 4.50 and CSS beverage tapping mechanism 4.45. As in the preferred embodiment, refrigerated source liquids are transferred from the refrigeration unit 4.15 through a portion control mechanism 4.40, associated metering device 4.41 and offline reporting capability 4.42, via refrigerated lines 4.35. Portion control is accounted for at the control mechanism 4.40 and desired refrigerated source liquids are dispensed according to a pre-set metered volume through the CSS beverage tapping mechanism 4.45.

In this alternative embodiment the invention is reduced to two stations, a PFS and CSS 4.10. The configuration however, requires the positioning of a remote compressor 4.55 with input and output lines 4.60 connecting to the CSS cold pan 4.50.

Figure 5:
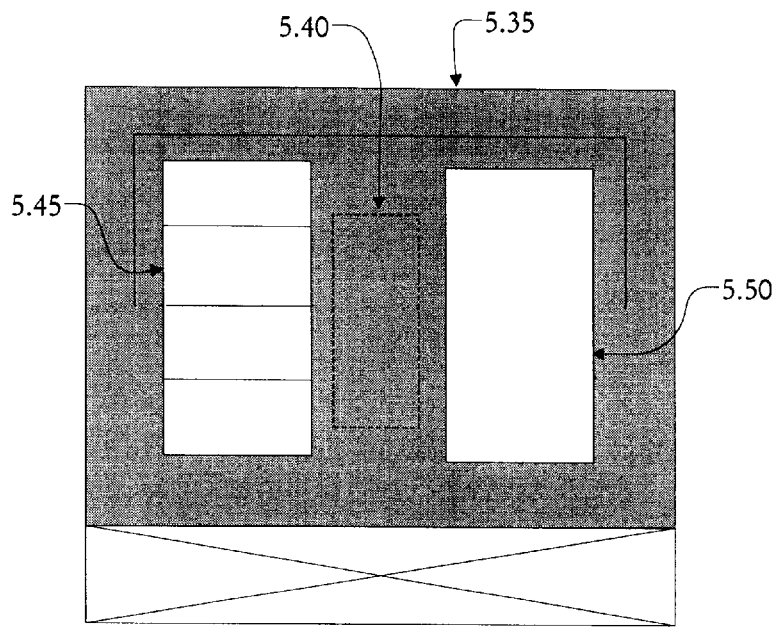
FIG. 5 is a schematic representation of a third alternative embodiment of components comprising an apparatus for dispensing, combining and blending refrigerated source liquids, ice and flavoring additives to create a beverage of pulverized, slush-like consistency.
Figure 5:
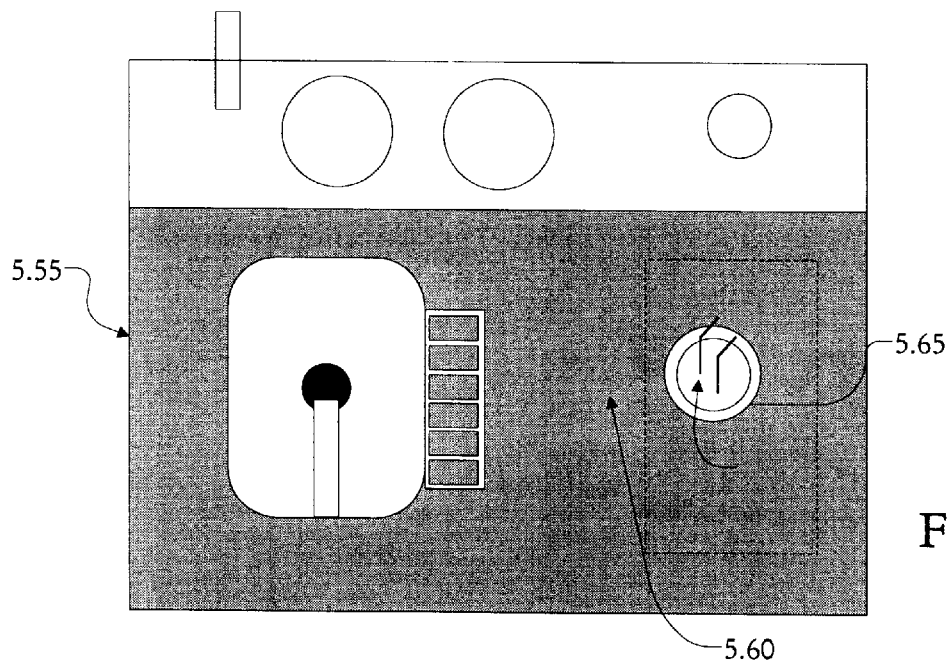

Referring now to FIG. 5, FIG. 5 shows an alternative embodiment for the invention' with the invention's refrigeration unit 5.65 integrated within the PFS 5.55, underneath the PFS beverage tapping mechanism 5.60. In this alternative embodiment, the invention's ice tray 5.50 has been moved to the CSS 5.35. This embodiment of the present invention eliminates the necessity for a remote compressor to service the invention's cold pan 5.45 as the compressor 5.40 is housed within the CFS 5.40, underneath the cold pan 5.45 and ice tray 5.50. While eliminating the need for a remote compressor, this configuration of invention components provides for increased efficiency by allowing for tapping, blending and cleaning operations to be combined within a single processing unit—the PFS 5.65.

While this invention has been described in reference to illustrative embodiments, this description is not to be construed in a limiting sense. Various modifications and combinations of the illustrative embodiments as well as other embodiments to the invention will be apparent to those persons skilled in the art upon reference to this disclosure. It is therefore intended that encompass any such modifications or embodiments.

We claim:

1. A system for dispensing and mixing refrigerated liquids, ice and flavoring additives comprising:
   a refrigeration unit;
   at least one refrigerated source liquid;
   at least one flavoring additive;
   at least one refrigerated source liquid conduit line;
   a customer service station including a cold pan, a drip pan, a breath guard, a portion control mechanism having access to at least one refrigerated source liquid conduit line, said refrigerated source liquid conduit line connecting said refrigerated source liquid and portion control mechanism;
   a mechanism for the metered dispensing and mixing of refrigerated source liquids and flavoring additives;
   a product finishing station comprised of at least one cup dispenser, at least one blending unit, an ice bin, a rinse sink and a drain board.

2. An apparatus for dispensing and mixing refrigerated liquids, ice and flavoring additives comprising:
   a refrigeration unit;
   at least one refrigerated source liquid;
   at least one refrigerated source liquid conduit line;
   at least one beverage flow measurement device;
   at least one beverage flow reporting device;
   at least one consumer service station beverage tapping mechanism;
   a customer service station including a cold pan, a drip pan, a breath guard, at least one refrigerated source liquid conduit line, the refrigerated source liquid conduit line connecting said refrigerated source liquid and said consumer service station beverage tapping mechanism;
   a product finishing station comprised of at least one blending unit, an ice bin, at least one cup dispenser and foot or hand activated rinse sink with integrated or detached drain board.

3. The apparatus of claim 2 where the refrigeration unit is a remotely located refrigeration unit.

4. An apparatus for dispensing and mixing refrigerated liquids, ice and flavoring additives comprising:
   a refrigeration unit;
   at least one refrigerated source liquid;
   at least one refrigerated source liquid conduit line;
   at least one beverage flow measurement device;
   at least one beverage flow reporting device;
   at least one consumer service station beverage tapping mechanism;
   a customer service station including a cold pan, a drip pan, a breath guard, a portion control mechanism having access to at least one refrigerated source liquid conduit line, the refrigerated source liquid conduit line connecting said refrigerated source liquid and said beverage tapping mechanism;
   a product finishing station comprised of at least one blending unit, an ice bin, at least one cup dispenser and foot or hand activated rinse sink with integrated or detached drain board.

5. The apparatus of claim 4 where the refrigeration unit is a remotely located refrigeration unit.

* * * * *